United States Patent
Davis (10) Patent No.: US 7,289,501 B2
(45) Date of Patent: Oct. 30, 2007

(54) METHOD AND APPARATUS FOR BANDWIDTH-EFFICIENT MULTICAST IN ETHERNET PASSIVE OPTICAL NETWORKS

(75) Inventor: Lawrence Drew Davis, Petaluma, CA (US)

(73) Assignee: Teknovus, Inc., Petaluma, CA (US)

( * ) Notice: Subject to any disclaimer, the term of this patent is extended or adjusted under 35 U.S.C. 154(b) by 902 days.

(21) Appl. No.: 10/703,359

(22) Filed: Nov. 6, 2003

(65) Prior Publication Data

US 2005/0100036 A1    May 12, 2005

(51) Int. Cl.
*H04L 12/28* (2006.01)
*H04L 12/56* (2006.01)

(52) U.S. Cl. .................. 370/390; 370/432; 398/98

(58) Field of Classification Search ............ 370/389, 370/390, 401, 431, 432; 398/98
See application file for complete search history.

(56) References Cited

U.S. PATENT DOCUMENTS

| | | | | |
|---|---|---|---|---|
| 6,023,467 A | * | 2/2000 | Abdelhamid et al. | 370/236.2 |
| 6,804,256 B2 | * | 10/2004 | Chang | 370/468 |
| 6,970,461 B2 | * | 11/2005 | Unitt et al. | 370/390 |
| 7,016,608 B1 | * | 3/2006 | Ball et al. | 398/71 |
| 2003/0152389 A1 | | 8/2003 | Sala et al. | 398/98 |
| 2004/0202174 A1 | * | 10/2004 | Kim et al. | 370/395.1 |

FOREIGN PATENT DOCUMENTS

| | | |
|---|---|---|
| EP | 1119120 A2 | 11/2000 |
| EP | 1351449 A1 | 10/2003 |

* cited by examiner

*Primary Examiner*—Ajit Patel
(74) *Attorney, Agent, or Firm*—Park, Vaughan & Fleming LLP; Shun Yao (57) ABSTRACT

One embodiment of the present invention provides a system that facilitates bandwidth-efficient multicast in EPONs. The system includes a central node and at least one remote node. Downstream data from the central node is broadcast through a passive optical coupler to remote nodes. In the other direction, upstream data from a remote node is transmitted through the passive optical coupler to the central node in a unicast manner. During operation, the system first selects a common multicast LLID to represent a number of remote nodes that comprise a multicast group. Upon receiving a multicast message destined to the multicast group, the system sends the multicast message along with the multicast LLID for the multicast group, whereby the multicast message is broadcast through the passive optical coupler in the downstream direction. This allows each remote node belonging to the multicast group to receive the multicast message by matching the multicast LLID.

27 Claims, 11 Drawing Sheets

METHOD AND APPARATUS FOR BANDWIDTH-EFFICIENT MULTICAST IN ETHERNET PASSIVE OPTICAL NETWORKS

BACKGROUND

1. Field of the Invention

The present invention relates to the design of passive optical networks. More specifically, the present invention relates to a method and apparatus for performing bandwidth-efficient multicast in Ethernet passive optical networks.

2. Related Art

In order to keep pace with increasing Internet traffic, optical fibers and associated optical transmission equipment have been widely deployed to substantially increase the capacity of backbone networks. However, this increase in the capacity of backbone networks has not been matched by a corresponding increase in the capacity of access networks. Even with broadband solutions, such as digital subscriber line (DSL) and cable modem (CM), the limited bandwidth offered by current access networks creates a severe bottleneck in delivering high bandwidth to end users.

Among the different technologies that are presently being developed, Ethernet passive optical networks (EPONs) are a promising candidate for next-generation access networks. EPONs combine the ubiquitous Ethernet technology with inexpensive passive optics. Hence, they offer the simplicity and scalability of Ethernet with the cost-efficiency and high capacity of passive optics. In particular, due to the high bandwidth of optical fibers, EPONs are capable of accommodating broadband voice, data, and video traffic simultaneously. Such integrated service is difficult to provide with DSL or CM technology. Furthermore, EPONs are more suitable for Internet Protocol (IP) traffic, since Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. Logically, the first mile is a point-to-multipoint network, with a central office servicing a number of subscribers. A tree topology can be used in an EPON, wherein one fiber couples the central office to a passive optical splitter, which divides and distributes downstream optical signals to subscribers and combines upstream optical signals from subscribers (see FIG. 1).

Figure 2:
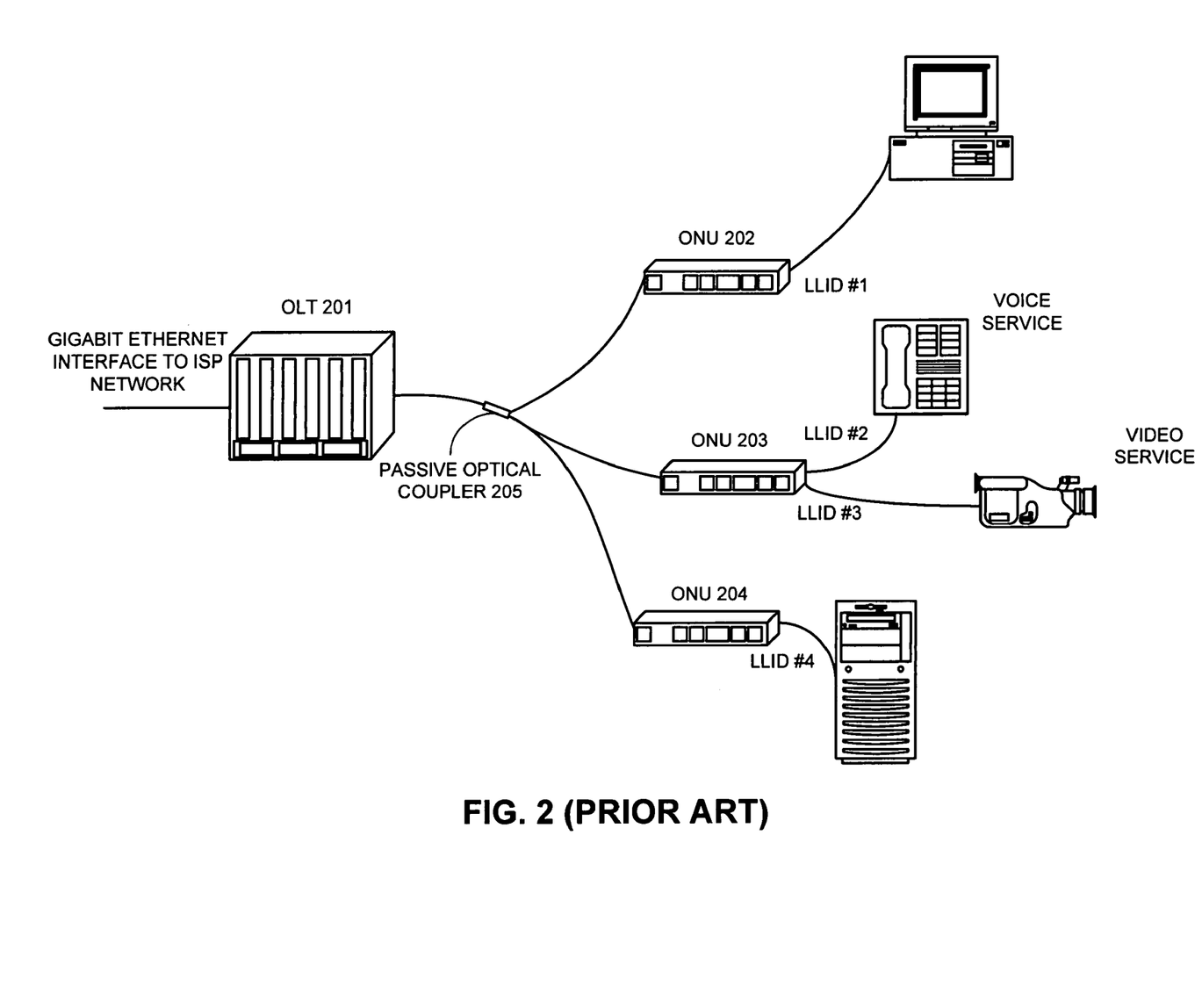
FIG. 2 illustrates a passive optical network including a single OLT and multiple ONUs.

Transmissions within an EPON are typically performed between an optical line terminal (OLT) and optical networks units (ONUs) (see FIG. 2). The OLT generally resides in the central office and couples the optical access network to the metro backbone, which is typically an external network belonging to an ISP or a local exchange carrier. The ONU can be located either at the curb or at an end-user location, and can provide broadband voice, data, and video services. ONUs are typically coupled to a one by N (1×N) passive optical coupler, where N is the number of ONUs, and the passive optical coupler is typically coupled to the OLT through a single optical link. This configuration can achieve significant savings in the number of fibers and amount of hardware required by EPONs.

Communications within an EPON can be divided into upstream traffic (from ONUs to OLT) and downstream traffic (from OLT to ONUs). In the upstream direction, the ONUs need to share channel capacity and resources, because there is only one link coupling the passive optical coupler with the OLT. In the downstream direction, because of the broadcast nature of the 1×N passive optical coupler, downstream data frames are broadcast by the OLT to all ONUs and are subsequently extracted by their destination ONUs based on their individual Logic Link Identifiers (LLIDs). (An LLID carries physical address information for a frame and determines which ONU is allowed to extract the frame.)

Although assigning individual LLIDs to ONUs facilitates unicast traffic with considerable simplicity, it is not an efficient solution for performing multicast, in which the OLT needs to send the same frame to more than one ONU. With conventional unicast LLIDs, multicast frames are replicated in the OLT, and are sent downstream multiple times as unicast frames, which is very wasteful with regard to bandwidth utilization.

Hence, what is needed is a method and apparatus for providing multicast in an EPON, which is both bandwidth-efficient and cost-effective, and which meets the existing Ethernet and EPON requirements.

SUMMARY

One embodiment of the present invention provides a system that facilitates bandwidth-efficient multicast in EPONs. The system includes a central node and at least one remote node. Downstream data from the central node is broadcast through a passive optical coupler to the remote nodes. In the other direction, upstream data from a remote node is transmitted through the passive optical coupler to the central node in a unicast manner. During operation, the system first selects a common multicast LLID to represent a number of remote nodes that comprise a multicast group. Upon receiving a multicast message destined to the multicast group, the system sends the multicast message along with the multicast LLID for the multicast group, whereby the multicast message is broadcast through the passive optical coupler in the downstream direction. This allows each remote node belonging to the multicast group to receive the multicast message by matching the multicast LLID.

In a variation of this embodiment, a remote node is allowed to join or leave the multicast group.

In a variation of this embodiment, a remote node which belongs to the multicast group is assigned the multicast LLID.

In a further variation, messages related to the assignment of a multicast LLID are communicated within operation, administration, and maintenance (OAM) frames.

In a variation of this embodiment, a remote node is also assigned an individual unicast LLID.

In a variation of this embodiment, upon receiving a request from a remote node to join a multicast group, the system assigns the corresponding multicast LLID to the remote node. In a further variation, the system receives an acknowledgment from the remote node after the remote node has successfully received the multicast LLID.

In a variation of this embodiment, the system assigns a multicast LLID to a remote node automatically upon discovering that the remote node is present within the Ethernet passive optical network and that the remote node belongs to a multicast group. In a further variation, the system receives an acknowledgment from the remote node after the remote node has successfully received the multicast LLID.

In a variation of this embodiment, the system forms a virtual local area network (VLAN) based on a multicast group, wherein each remote node within the VLAN is capable of broadcasting to every other remote node within the VLAN by sending a message with the corresponding multicast LLID, and wherein any remote node outside the VLAN is precluded from receiving the message.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, application specific integrated circuits (ASICs), field-programmable gate arrays (FPGAs), semiconductor memories, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Passive Optical Network Topology

Figure 1:
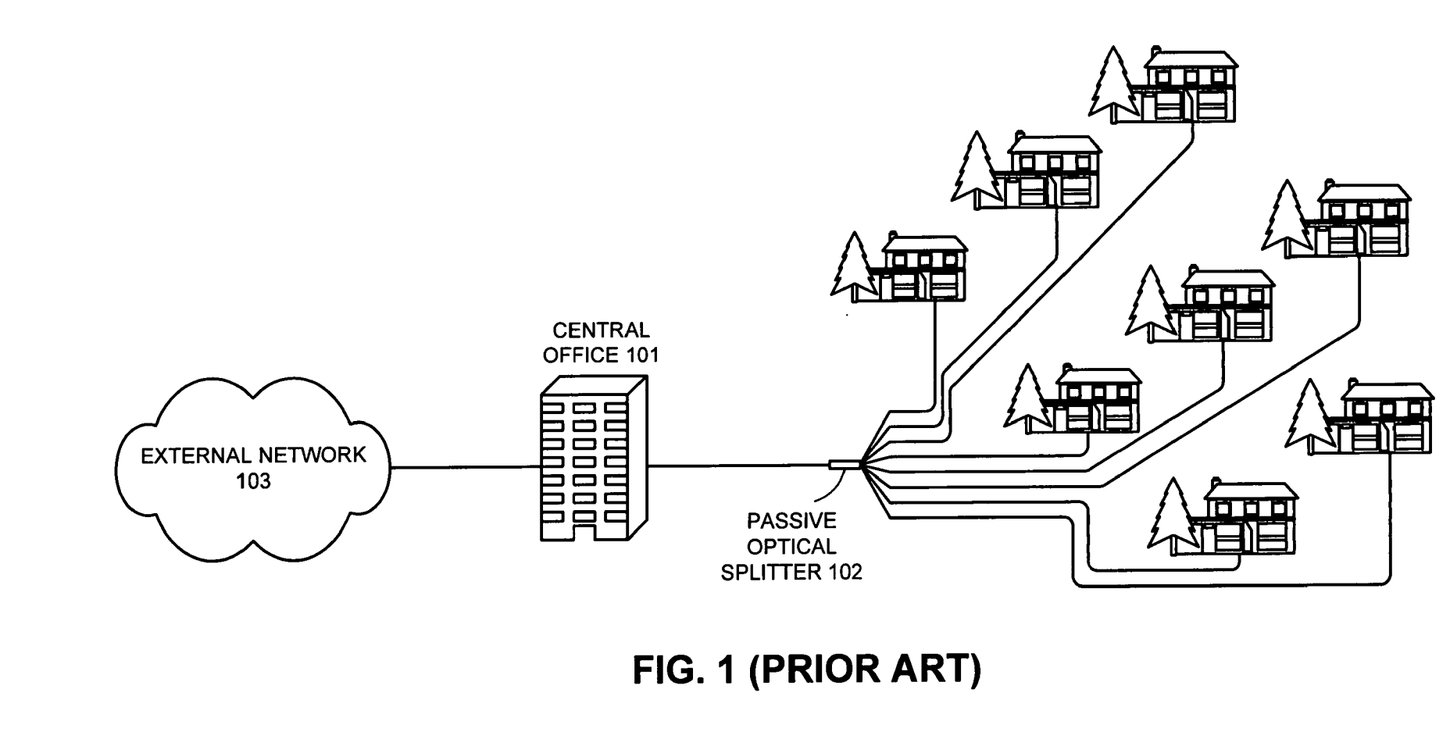
FIG. 1 illustrates a passive optical network wherein a central office and a number of subscribers are coupled together through optical fibers and a passive optical splitter.

FIG. 1 illustrates a passive optical network (PON), wherein a central office and a number of subscribers are coupled together through optical fibers and a passive optical splitter. As shown in FIG. 1, a number of subscribers are coupled to a central office 101 through optical fibers and a passive optical splitter 102. Passive optical splitter 102 can be placed in the vicinity of end-user locations, so that the initial fiber deployment cost is minimized. Central office 101 can be coupled to an external network 103, such as a metropolitan area network operated by an Internet service provider (ISP). Note that although FIG. 1 illustrates a tree topology, a PON can also be based on other topologies, such as a ring or a bus.

FIG. 2 illustrates a passive optical network including a single OLT and multiple ONUs. OLT 201 is coupled with ONUs 202, 203, and 204 through optical fibers and a passive optical coupler 205. As is illustrated in FIG. 2, an ONU can accommodate a number of networked devices, such as personal computers, telephones, video equipment, network servers, etc. One or more networked devices belonging to the same class of service are typically assigned a Logical Link ID (LLID), as defined in the IEEE 802.3 standard. An LLID establishes a logical link between an ONU and OLT, which accommodates specific service level agreement (SLA) requirements. In this example, LLID #1 is assigned to regular data services for ONU 202; LLID #2 is assigned to voice services for ONU 203; LLID #3 is assigned to video services for ONU 203; and LLID #4 is assigned to mission-critical data services for ONU 204.

General Ethernet Requirement

Figure 3:
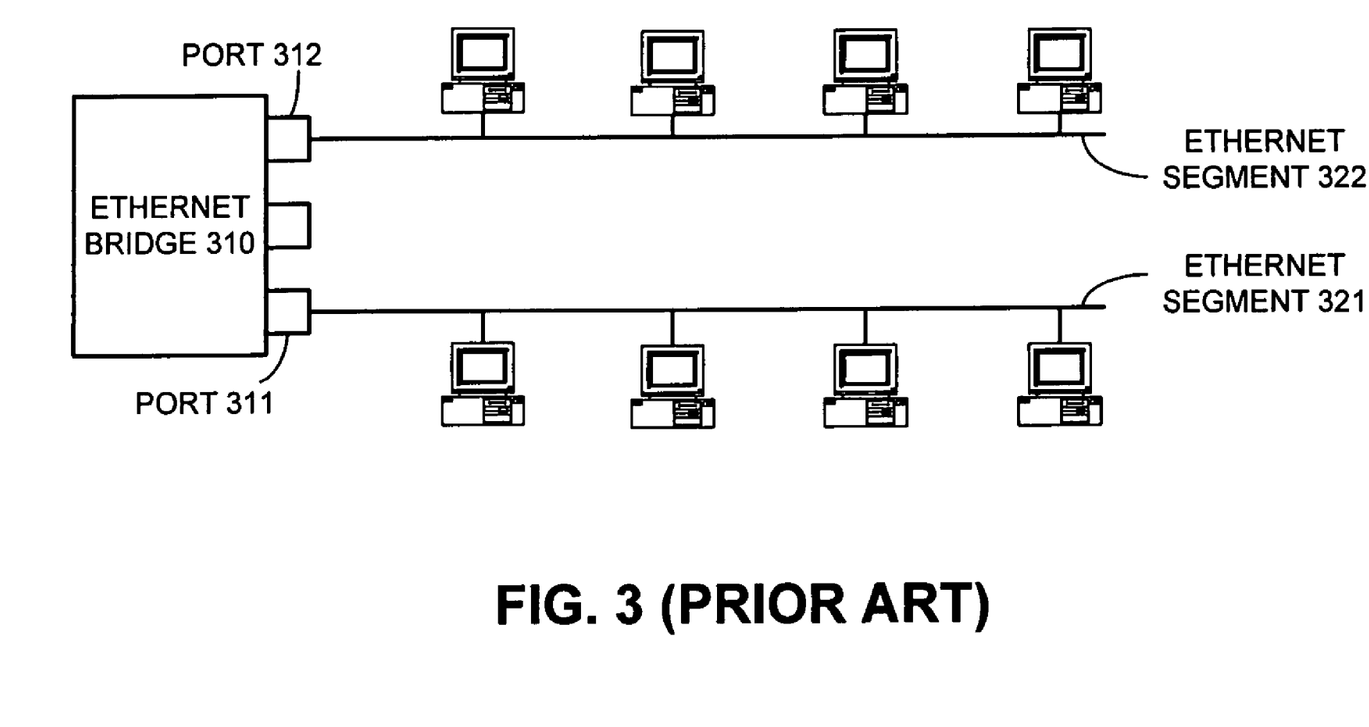
FIG. 3 illustrates bridged Ethernet segments.

FIG. 3 illustrates bridged Ethernet segments. In general, the IEEE 802 standards define two operational modes for Ethernet: shared-medium and full-duplex. Within a shared-medium segment, all hosts are coupled to a single broadcast domain where at most one host can transmit at a time while all other hosts can receive the transmitted signal. This is the most common Ethernet implementation. A full-duplex segment is a point-to-point link that couples together two hosts, or a host and an Ethernet bridge, wherein both ends can transmit and receive simultaneously.

An Ethernet bridge typically couples together multiple Ethernet segments to allow inter-segment communications. As shown in FIG. 3, Ethernet bridge 310 has multiple ports. Shared-medium segments 322 and 321 are coupled to ports 312 and 311, respectively. If a host on segment 322 sends a data frame to a host on segment 321, the data frame will be switched by Ethernet bridge 310 from port 312 to port 311 according to its destination Ethernet (also called Media Access Control, MAC) address. If a host on segment 322 sends a data frame to another host on the same segment, Ethernet bridge 310 will do nothing, because it assumes any segment connected to a port is either a single host, or a shared-medium segment. (Note that a shared-medium segment, being a broadcast network, can deliver its own intra-segment data frames.)

Point-to-Point Emulation (PtPE)

The above-described bridging behavior (as defined by the IEEE 802 architecture) presents a problem within an EPON: if all the upstream traffic is received at one port of an Ethernet bridge in the OLT, users connected to different ONUs on the same EPON are unable to communicate with one another without data being processed at layer 3 (network layer). Such a configuration forces data traffic among ONUs within the same EPON to be processed and switched by equipment that resides outside the EPON (e.g., an IP router to which the OLT is connected). This is a very inefficient way of delivering intra-EPON traffic.

To resolve this problem, and to ensure seamless integration of an EPON with other Ethernet networks, devices attached to the EPON medium can have an additional sub-layer that, based on its configuration, will emulate either a shared medium or a point-to-point medium. This sub-layer is referred to as Shared-Medium Emulation (SME) or Point-to-Point Emulation (PtPE) sub-layer. This emulation sub-layer resides below the MAC layer to preserve existing Ethernet MAC operation defined in IEEE P802.3 standard. Operation of this emulation layer relies on tagging of Ethernet frames with tags unique for each ONU. These tags are called logic link ID (LLID) and are placed in the preamble before each frame.

Figure 4:
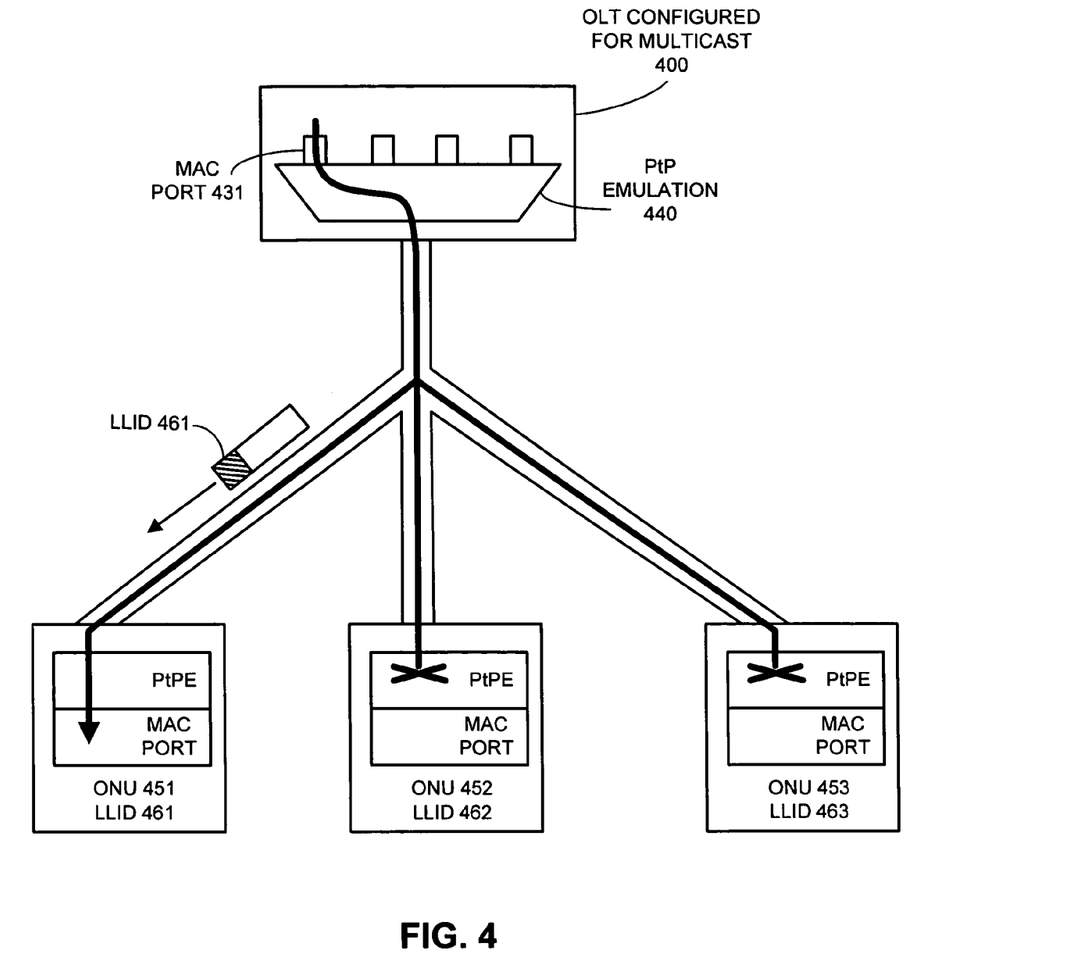
FIG. 4 illustrates transmission of downstream unicast traffic from the OLT to an ONU in an EPON in accordance with an embodiment of the present invention.

FIG. 4 illustrates transmission of downstream unicast traffic from the OLT to an ONU in an EPON in accordance to and embodiment of the present invention. In PtP emulation mode, multicast-enabled OLT 400 has multiple MAC ports (interfaces), each of which corresponds to an ONU. When sending an Ethernet frame downstream from MAC port 431, PtP emulation sub-layer 440 in OLT 400 inserts LLID 461 which is associated with MAC port 431. Although the frame is broadcast by the passive optical coupler to every ONU, only one PtPE sub-layer will match that frame's LLID with the values assigned to the corresponding ONU. The matching ONU will accept the frame and pass it to its MAC layer for further verification. MAC layers in other ONUs (ONU 452 with LLID 462, and ONU 453 with LLID 463) will never receive that frame. Accordingly, it appears as if the frame was sent on a point-to-point link to only the destination ONU.

Figure 5:
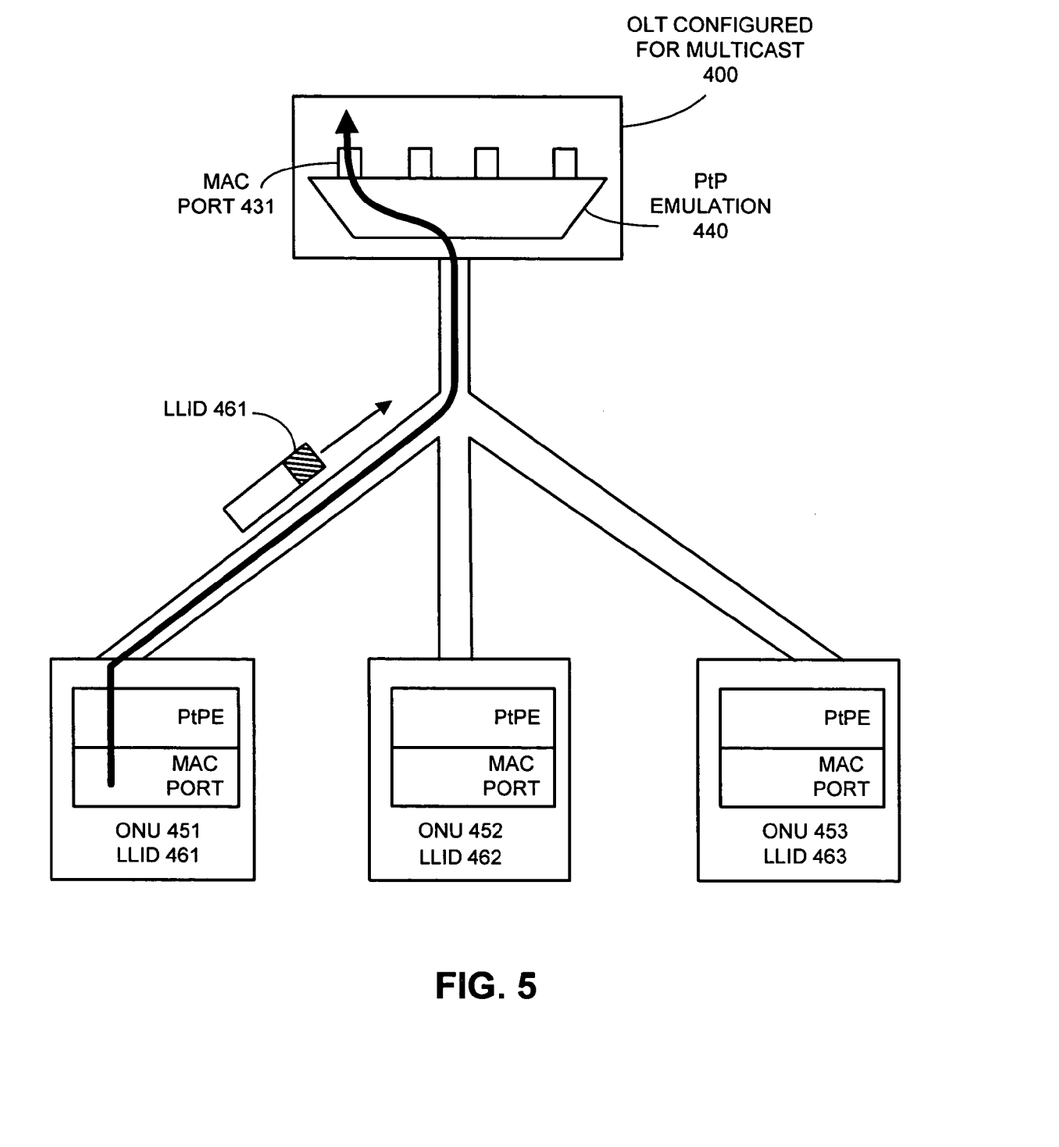
FIG. 5 illustrates transmission of upstream traffic from and ONU to the OLT in an EPON in accordance with an embodiment of the present invention.

FIG. 5 illustrates transmission of upstream traffic from and ONU to the OLT in an EPON in accordance to and embodiment of the present invention. In the upstream direction, ONU 451 inserts its assigned LLID 461 in the preamble of each transmitted frame. PtPE sub-layer 440 of multicast-enabled OLT 400 disseminates the frame to MAC port 431 accordingly.

Bridging in EPON

Figure 6:
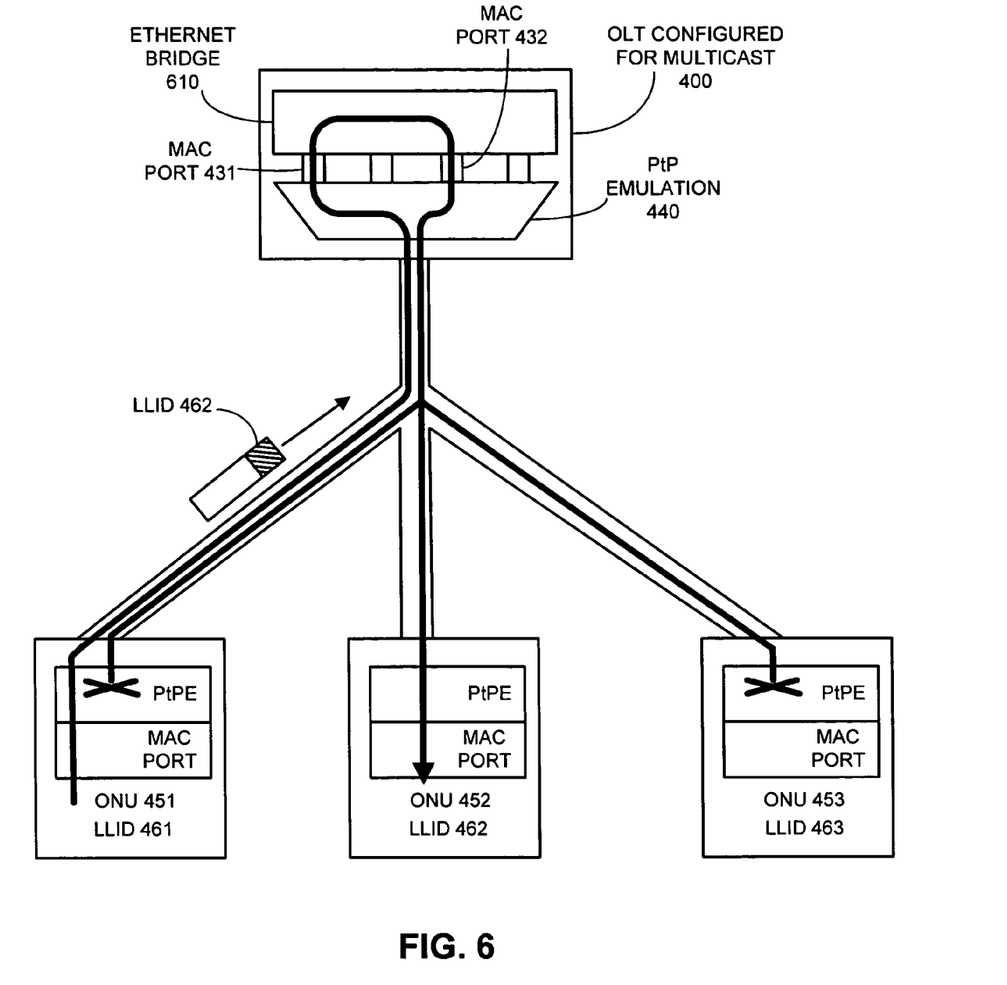
FIG. 6 illustrates transmission of unicast traffic from one ONU to another ONU with bridging in an EPON in accordance with an embodiment of the present invention.

FIG. 6 illustrates transmission of unicast traffic from one ONU to another ONU with bridging in an EPON in accordance to and embodiment of the present invention. When ONU 451 needs to send a frame to ONU 452, it tags the frame with ONU 452's LLID 462. This tagged frame is then relayed accordingly from MAC port 431 to MAC port 432 by Ethernet bridge 610. The frame is subsequently sent downstream by OLT 400 and is received by ONU 452.

Multicast in EPON

Figure 7:
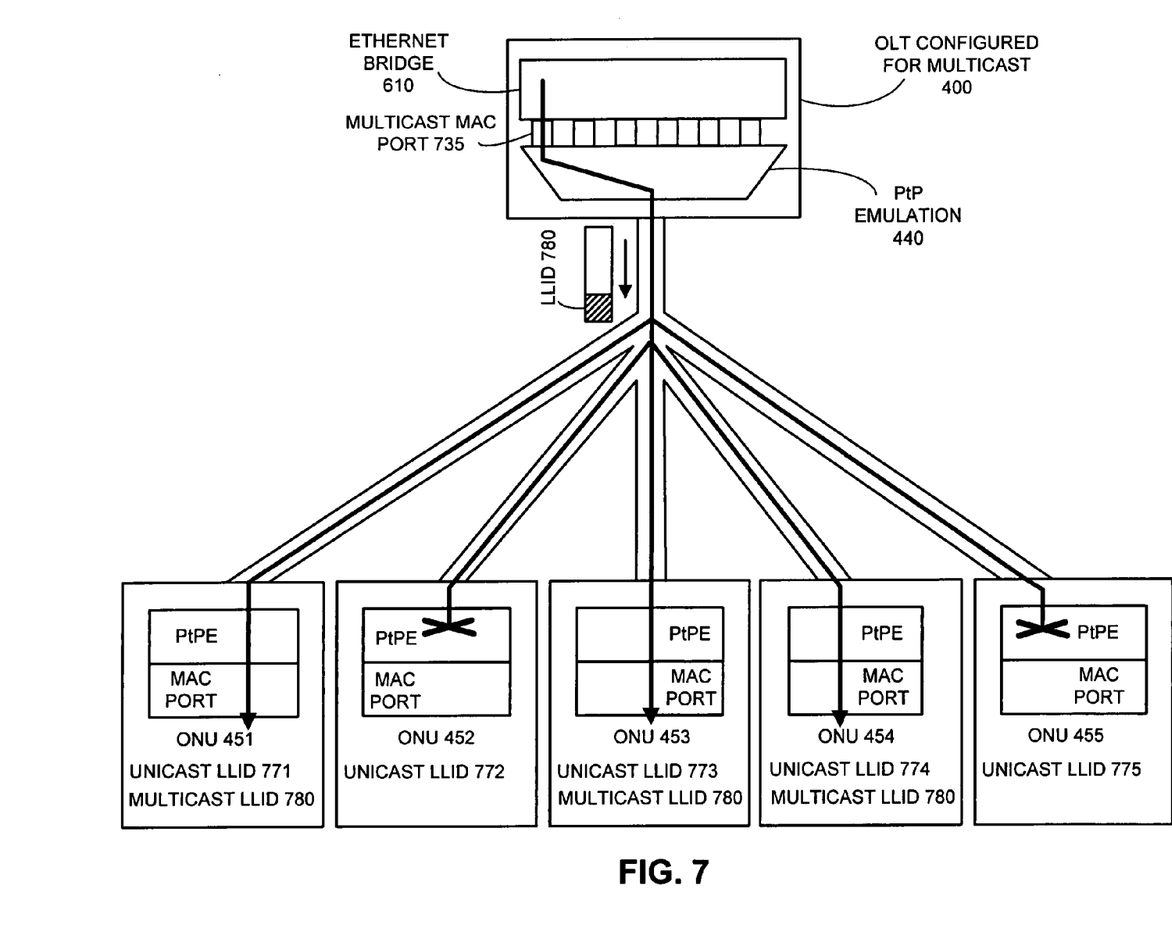
FIG. 7 illustrates transmission of multicast traffic in an EPON in accordance with an embodiment of the present invention.

FIG. 7 illustrates transmission of multicast traffic in an EPON in accordance with an embodiment of the present invention. A problem with current LLID assignment standards is that they do not support efficient multicast, which is the transmission of the same copy of data to a number of arbitrarily selected ONUs within the same EPON. The underlying reason is that current standards define only LLIDs for either individual ONUs or for all ONUs in the entire EPON (broadcast). Consequently, when a frame is to be sent out to multiple specifically selected ONUs in the same EPON, multiple copies of the frame have to be made for each destination ONU, and the OLT needs to transmit multiple copies. (Broadcast LLID is not applicable to multicast applications because it is all-inclusive.) This is an awkward and inefficient way of performing multicast within an EPON.

Fortunately, a unique feature of an EPON is its inherent broadcast capability provided through the use of a passive optical coupler. In the physical layer, every downstream optical signal from the OLT is split and delivered to every ONU within the EPON. Hence, a multicast mechanism based on the inherent broadcast capabilities of EPON is a more desirable approach. One way of taking advantage of the broadcast capabilities of EPON is to designate a special multicast LLID, as opposed to performing multicast through unicast LLIDs assigned to individual ONUs. The multicast LLID is associated with a selected subset of the ONUs, which constitutes a multicast group. Each ONU belonging to this multicast group is allowed to receive and forward frames that are tagged with the multicast LLID.

As illustrated in FIG. 7, an EPON includes ONUs 451, 452, 453, 454, and 455, which are associated with unicast LLIDs 771, 772, 773, 774, and 775, respectively. ONUs 451, 453, and 454 also belong to a multicast group, which is associated with multicast LLID 780. Accordingly, multicast MAC port 735 corresponds to multicast LLID 780. When a multicast frame arrives at multicast-enabled OLT 400, it is tagged with LLID 780 and sent downstream. Note that this frame is transmitted downstream only once by OLT 400 to all the ONUs. Upon matching the frame's tag with assigned multicast LLID 780, ONUs 451, 453, and 454 can receive the frame.

Figure 8:
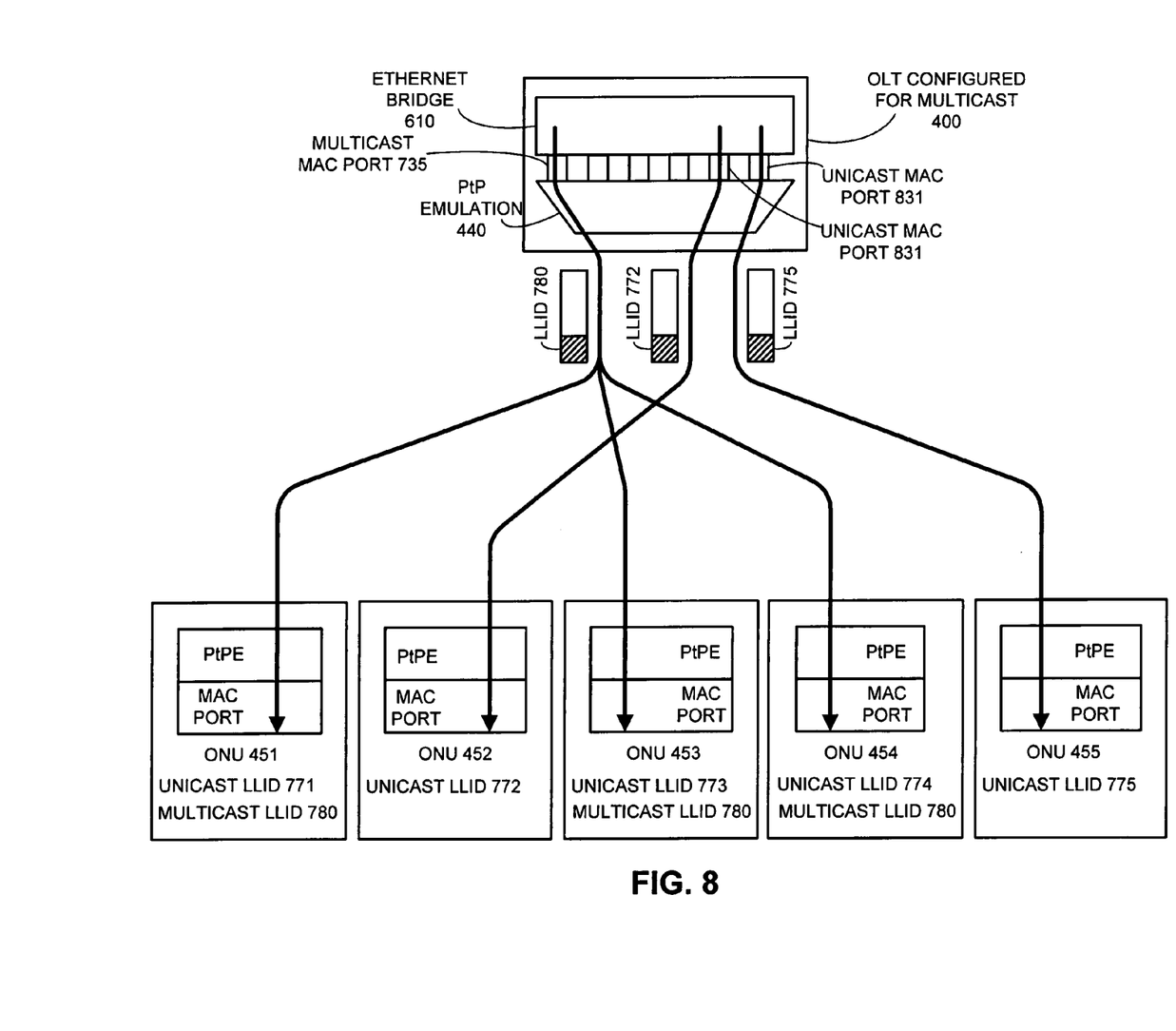
FIG. 8 illustrates coexistence of both multicast traffic and unicast traffic in an EPON in accordance with an embodiment of the present invention.

FIG. 8 illustrates coexistence of both multicast traffic and unicast traffic in an EPON in accordance with an embodiment of the present invention. In this example, unicast MAC port 832 is associated with unicast LLID 772, and unicast MAC port 831 is associated with unicast LLID 775. When unicast frames destined for ONU 452 and 455 arrive at OLT 400, they are tagged with unicast LLIDs 772 and 775, respectively. The unicast frames are sent downstream and reach every ONU, but only the associated ONU will match the frame's tag with its assigned unicast LLID. Note that a multicast frame can be delivered to a multicast group with a multicast LLID, in the same way that a unicast frame is delivered to a single ONU.

VLAN Configuration

Figure 9:
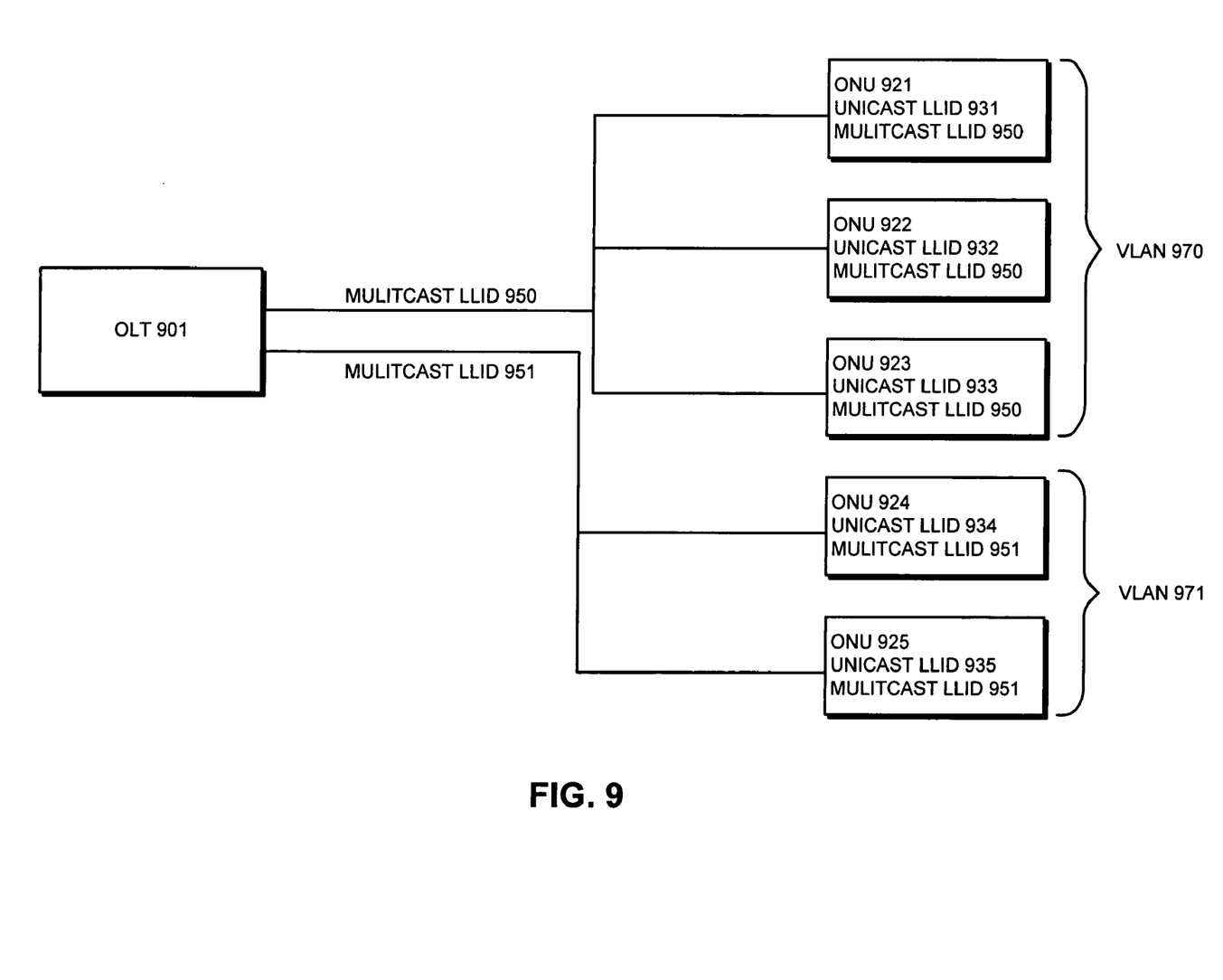
FIG. 9 illustrates formation of VLANs based on multicast groups in accordance with an embodiment of the present invention.

FIG. 9 illustrates formation of VLANs based on multicast groups in accordance with an embodiment of the present invention. With multicast LLIDs, it is now possible to form multiple VLAN segments within an EPON. Each VLAN segment is based upon a multicast group with a corresponding multicast LLID, wherein a frame sent to a particular VLAN segment is broadcast to all the group members. Such a multicast-group based VLAN segment resembles the shared-medium Ethernet configuration in a much more intuitive and efficient way than higher-layer VLAN emulations.

As a VLAN member, an ONU can have not only a multicast LLID but also its unique unicast LLID, which provides great flexibility in communicating with other nodes.

FIG. 9 illustrates two VLANs, 970 and 971. As shown in FIG. 9, VLAN 970 includes ONUs 921, 922, and 923, which are assigned multicast LLID 950 and unicast LLIDs 931, 932, and 933, respectively. VLAN 971 includes ONUs 924 and 925, which are assigned multicast LLID 951 and unicast LLIDs 934 and 935, respectively.

Multicast LLID Assignment by "Push"

Figure 10A:
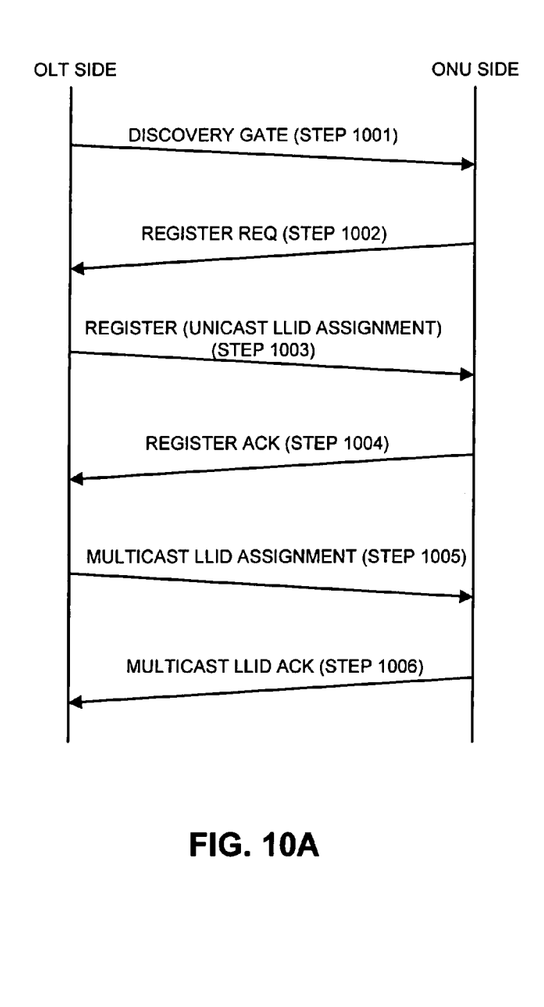
FIG. 10A presents a time-space diagram illustrating the process of assigning a multicast LLID to an ONU upon discovery of the ONU's existence within an EPON ("push" process).
Figure 10B:
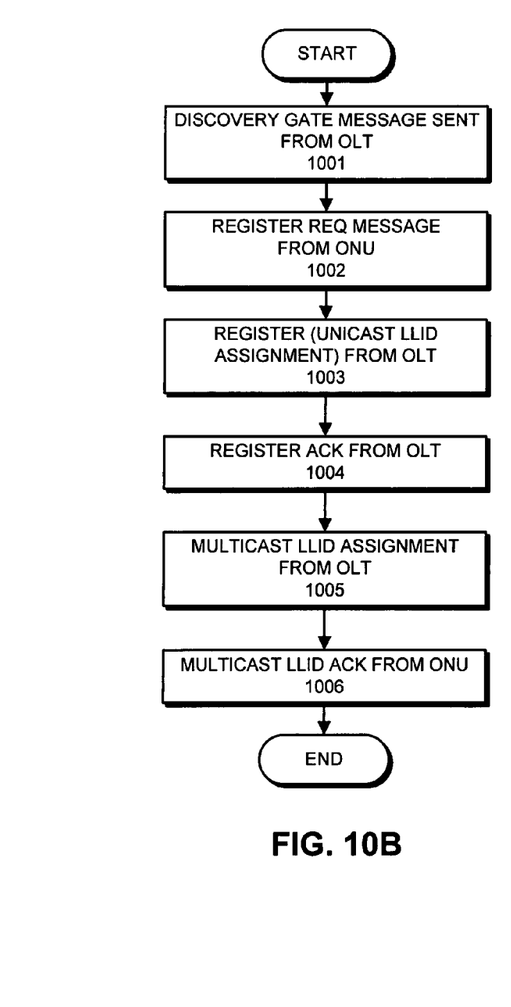
FIG. 10B presents a corresponding flow chart in accordance with an embodiment of the present invention.

FIGS. 10A and 10B presents a diagram and a corresponding flow chart illustrating the process of assigning a multicast LLID to an ONU upon discovery of the ONU's existence within an EPON ("push" process). FIG. 10A illustrates a time-space diagram showing the exchange of control messages between an OLT and an ONU for the "push" multicast LLID assignment. FIG. 10B presents the flow chart corresponding to FIG. 10A.

The system starts by regularly broadcasting discovery query (DISCOVERY GATE) messages from the OLT (step 1001). When an ONU joins the EPON, it sends a register request (REGISTER REQ) message to the OLT (step 1002). Next, the OLT assigns a unicast LLID to the requesting ONU in a register message (step 1003). Upon receiving the unicast LLID, the ONU sends back an acknowledgment (REGISTER ACK) message to the OLT (step 1004). The OLT then assigns a multicast LLID to the ONU (step 1005). Upon receiving the multicast LLID, the ONU sends back an acknowledgment (MULTICAST LLID ACK) message to the OLT (step 1006). Note that all of the above messages can be carried in operation, administration, and maintenance (OAM) frames.

Figure 11A:
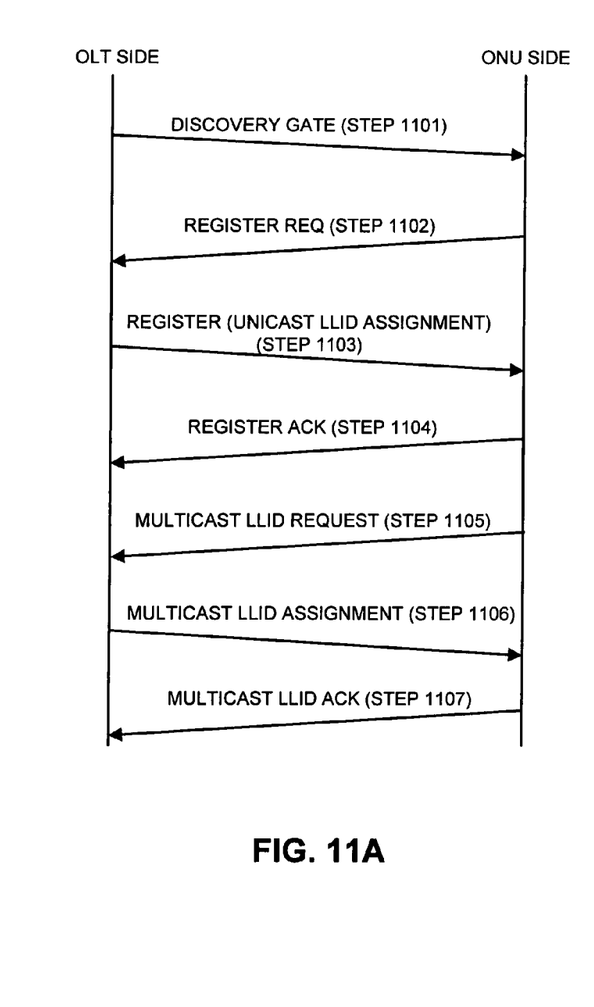
FIG. 11A presents a time-space diagram illustrating the process of assigning a multicast LLID to an ONU upon receiving a request from the ONU to join a multicast group ("pull" process).
Figure 11B:
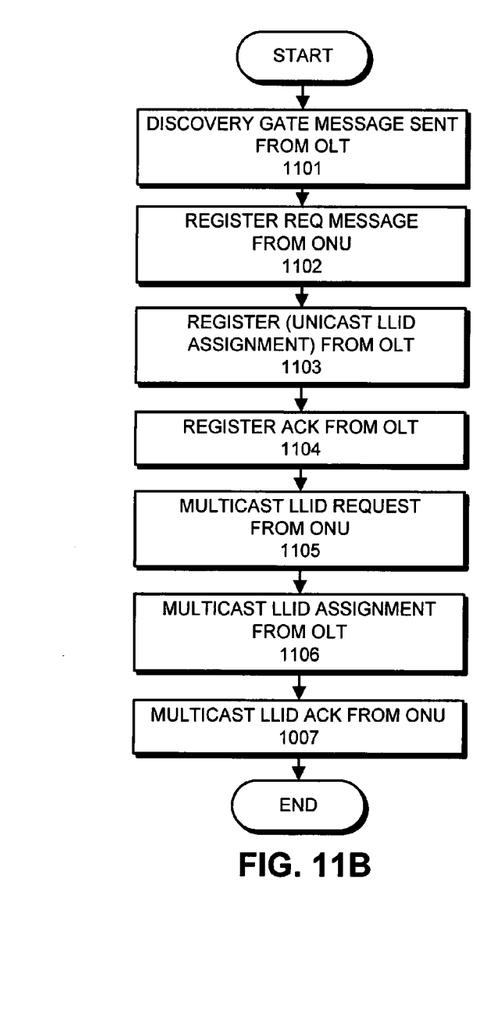
FIG. 11B presents a corresponding flow chart in accordance with an embodiment of the present invention.

FIGS. 11A and 11B present a diagram and a corresponding flow chart illustrating the process of assigning a multicast LLID to an ONU upon receiving a request from the ONU to join a multicast group ("pull" process). FIG. 11A illustrates a time-space diagram showing the exchange of control messages between an OLT and an ONU for the "pull" multicast LLID assignment. FIG. 11B presents the flow chart corresponding to FIG. 11A.

The system starts by regularly broadcasting discovery query (DISCOVERY GATE) messages from the OLT (step 1101). When an ONU joins the EPON, it sends a register request (REGISTER REQ) message to the OLT (step 1102). Next, the OLT assigns a unicast LLID to the requesting ONU in a register message (step 1103). Upon receiving the unicast LLID, the ONU sends back an acknowledgment (REGISTER ACK) message to the OLT (step 1104). The ONU further sends a multicast LLID request to the OLT to join a specific multicast group (step 1105). The OLT then assigns the corresponding multicast LLID to the ONU (step 1106). Upon receiving the multicast LLID, the ONU sends back an acknowledgment (MULTICAST LLID ACK) message to the OLT (step 1107). Note that all of the above messages can be carried in OAM frames.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing multicast in an Ethernet passive optical network which includes a central node and at least one remote node, wherein downstream data from the central node is broadcast through the passive optical coupler to the remote nodes, and wherein upstream data from a remote node is transmitted through the passive optical coupler to the central node in a unicast manner, the method comprising: selecting a common multicast logic link ID (LLID) to represent a number of remote nodes that comprise a multicast group; upon receiving a multicast message destined to the multicast group, sending the multicast message along with the multicast LLID for the multicast group, whereby the multicast message is broadcast through the passive optical coupler in the downstream direction, and whereby each remote node belonging to the multicast group can receive the multicast message by matching the multicast LLID; and forming a virtual local area network (VLAN) based on a multicast group, wherein each remote node within the VLAN is capable of broadcasting to every other remote node within the VLAN by sending a message with the corresponding multicast LLID, and wherein any remote node outside the VLAN is precluded from receiving the message.

2. The method of claim 1, further comprising allowing a remote node to join or leave the multicast group.

3. The method of claim 1, further comprising assigning the multicast LLID to a remote node which belongs to the multicast group.

4. The method of claim 3, further comprising communicating messages related to the assignment of a multicast LLID within operation, administration, and maintenance (OAM) frames.

5. The method of claim 1, further comprising assigning a remote node an individual unicast LLID.

6. The method of claim 1, further comprising receiving a request from a remote node to join a multicast group, and, in response to the request, assigning a corresponding multicast LLID to the remote node.

7. The method of claim 6, further comprising receiving an acknowledgment from the remote node after the remote node has successfully received the multicast LLID.

8. The method of claim 1, further comprising assigning a multicast LLID to a remote node automatically upon discovering that the remote node is present within the Ethernet passive optical network and that the remote node belongs to a multicast group.

9. The method of claim 8, further comprising receiving an acknowledgment from the remote node after the remote node has successfully received the multicast LLID.

10. An apparatus that performs multicast in an Ethernet passive optical network, comprising:
at least one remote node
a central node configured to, select a common multicast LLID to represent a number of remote nodes that comprise a multicast group, and
upon receiving a multicast message destined to the multicast group, send the multicast message along with the multicast LLID for the multicast group, whereby the multicast message is broadcast through the passive optical coupler in the downstream direction, and whereby each remote node belonging to the multicast group can receive the multicast message by matching the multicast LLID; and a passive optical coupler coupled between the central node and the remote nodes, whereby downstream data from the central node to remote nodes is broadcast through the passive optical coupler, and whereby upstream data from a remote node to the central node is transmitted through the passive optical coupler in a unicast manner, wherein the multicast group forms a VLAN, wherein each remote node within the VLAN is capable of broadcasting to every other remote node within the VLAN by sending a message with the corresponding multicast LLID, and wherein any remote node outside the VLAN is precluded from receiving the message.

11. The apparatus of claim 10, further comprising a mechanism that allows a remote node to join or leave the multicast group.

12. The apparatus of claim 10, wherein the central node is further configured to assign the multicast LLID to a remote node which belongs to the multicast group.

13. The apparatus of claim 12, wherein that the central node is further configured to communicate messages related to the assignment of a multicast LLID within OAM frames.

14. The apparatus of claim 10, wherein the central node is further configured to assign a remote node an individual unicast LLID.

15. The apparatus of claim 10, wherein the central node is further configured to receive a request from a remote node to join a multicast group, and, in response to the request, to assign a corresponding multicast LLID to the remote node.

16. The apparatus of claim 15, wherein the central node is further configured to receive an acknowledgment from the remote node after the remote node has successfully received the multicast LLID.

17. The apparatus of claim 10, wherein the central node is further configured to assign a multicast LLID to remote node automatically upon discovering that the remote node is present within the Ethernet passive optical network and that the remote node belongs to a multicast group.

18. The apparatus of claim 17, wherein the central node is further configured to receive an acknowledgment from the remote node after the remote node has successfully received the multicast LLID.

19. A computer-readable storage medium storing instructions that when executed by a computer cause the computer to perform a method for performing multicast in an Ethernet passive optical network which includes a central node and at least one remote node, wherein downstream data from the central node is broadcast through the passive optical coupler to the remote nodes, and wherein upstream data from a remote node is transmitted through the passive' optical coupler to the central node in a unicast manner, the method comprising:

selecting a common multicast logic link ID (LLID) to represent a number of remote nodes that comprise a multicast group;

upon receiving a multicast message destined to the multicast group, sending the multicast message along with the multicast LLID for the multicast group, whereby the multicast message is broadcast through the passive optical coupler in the downstream direction, and whereby each remote node belonging to the multicast group can receive the multicast message by matching the multicast LLID; and forming a virtual local area network (VLAN) based on a multicast group, wherein each remote node within the VLAN is capable of broadcasting to every other remote node within the VLAN by sending a message with the corresponding multicast LLID, and wherein any remote node outside the VLAN is precluded from receiving the message.

20. The computer-readable storage medium of claim 19, wherein the method further comprises allowing a remote node to join or leave the multicast group.

21. The computer-readable storage medium of claim 19, wherein the method further comprises assigning the multicast LLID to a remote node which belongs to the multicast group.

22. The computer-readable storage medium of claim 21, wherein the method further comprises communicating messages related to the assignment of a multicast LLID within OAM frames.

23. The computer-readable storage medium of claim 19, wherein the method further comprises assigning a remote node an individual unicast LLID.

24. The computer-readable storage medium of claim 19, wherein the method further comprises receiving a request from a remote node to join a multicast group, and, in response to the request, assigning a corresponding multicast LLID to the remote node.

25. The computer-readable storage medium of claim 24, wherein the method further comprises receiving an acknowledgment from the remote node after the remote node has successfully received the multicast LLID.

26. The computer-readable storage medium of claim 19, wherein the method further comprises assigning a multicast LLID to a remote node automatically upon discovering that the remote node is present within the Ethernet passive optical network and that the remote node belongs to a multicast group.

27. The computer-readable storage medium of claim 26, wherein the method further comprises receiving an acknowledgment from the remote node after the remote node has successfully received the multicast LLID.

* * * * *